US008700629B2

(12) United States Patent
Engel et al.

(10) Patent No.: US 8,700,629 B2
(45) Date of Patent: Apr. 15, 2014

(54) AUTOMATIC IDENTIFICATION OF ABSTRACT ONLINE GROUPS

(75) Inventors: David W. Engel, Kennewick, WA (US); Michelle L. Gregory, Richland, WA (US); Eric B. Bell, Richland, WA (US); Andrew J. Cowell, Kennewich, WA (US); Andrew W. Piatt, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 134 days.

(21) Appl. No.: 13/540,759

(22) Filed: Jul. 3, 2012

(65) Prior Publication Data

US 2013/0191390 A1      Jul. 25, 2013

Related U.S. Application Data

(63) Continuation-in-part of application No. 13/036,776, filed on Feb. 28, 2011, now Pat. No. 8,239,425.

(60) Provisional application No. 61/508,794, filed on Jul. 18, 2011.

(51) Int. Cl.
*G06F 17/30* (2006.01)
(52) U.S. Cl.
USPC .......................................................... 707/737
(58) Field of Classification Search
CPC ................................................ G06F 17/30705
USPC ................................ 707/737, 736, 738, 758
See application file for complete search history.

(56) References Cited

U.S. PATENT DOCUMENTS

| 6,014,904 A | * | 1/2000 | Lock ............................ 73/865.5 |
| 2010/0312769 A1 | | 12/2010 | Bailey et al. |
| 2012/0117059 A1 | * | 5/2012 | Bailey et al. .................. 707/723 |
| 2012/0137367 A1 | * | 5/2012 | Dupont et al. .................. 726/25 |

FOREIGN PATENT DOCUMENTS

| JP | 2009-211280 A | 9/2009 |
| KR | 10-2011-0051678 A | 5/2011 |

OTHER PUBLICATIONS

Automatically Identifying Groups Based on Content and Collective Behavioral Patterns of groups Member, Mchelle Gregory et al., 2011, Association for the Advancement of Artificial.*
International Search Report and Written Opinion for International Application No. PCT/US2012/046016, International Filing Date Jul. 10, 2012, Date of Mailing Jan. 23, 2013.

(Continued)

*Primary Examiner* — Hung T Vy
(74) *Attorney, Agent, or Firm* — Allan C. Tuan

(57) ABSTRACT

Online abstract groups, in which members aren't explicitly connected, can be automatically identified by computer-implemented methods. The methods involve harvesting records from social media and extracting content-based and structure-based features from each record. Each record includes a social-media posting and is associated with one or more entities. Each feature is stored on a data storage device and includes a computer-readable representation of an attribute of one or more records. The methods further involve grouping records into record groups according to the features of each record. Further still the methods involve calculating an n-dimensional surface representing each record group and defining an outlier as a record having feature-based distances measured from every n-dimensional surface that exceed a threshold value. Each of the n-dimensional surfaces is described by a footprint that characterizes the respective record group as an online abstract group.

18 Claims, 4 Drawing Sheets

(56) References Cited

OTHER PUBLICATIONS

Gregory, M., et al., Automatically Identifying Groups Based on Content and Collective Behavioral Patters of Group Members, Proceedings of the Fifth International AAAI Conference on Weblogs and Social Media. Palo Alto: AAAI Press, Jul. 17, 2011, pp. 498-501.

Maia, Marcelo, et al., "Identifying User Behavior in Online Social Networks," SocialNets '08, 2008, pp. 1-6, ACM, New York, NY, USA.

* cited by examiner

Cluster 1    Cluster 2    Cluster 3

Cluster 4    Cluster 5    Cluster 6

AUTOMATIC IDENTIFICATION OF ABSTRACT ONLINE GROUPS

PRIORITY

This application claims priority from, and is a continuation in part of, currently pending U.S. patent application Ser. No. 13/036,776, filed Feb. 28, 2011. It also claims priority from U.S. Provisional Patent Application 61/508,794, entitled Automatic Identification of Abstract Online Groups, filed Jul. 18, 2011. Both applications are incorporated herein by reference.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

The explosion of popularity in social media, such as internet forums, weblogs (blogs), wikis, etc., in the past decade has created a new opportunity to measure public opinion, attitude, and social structures. A very common social structure investigated is online communities, or groups. There are a number of motivations for studying online groups and communities; increasing online community involvement; recommender systems; collaborative filtering; and identifying authoritative or influential sources.

Methods described to identify online communities tend to rely on varying methods for link analysis. In other words, an online community is commonly defined as the amount of online interconnectedness of entities. While these approaches have been shown to be effective in some contexts, relying on interconnectedness for identifying a community can miss many potential opportunities to identify groups of people that are very similar to one another, but may never actually interact online.

While the traditional definition of groups can include face-to-face interaction between entities, it is well recognized that online groups need not comprise entities who have met face-to-face, but rather who have interacted in some manner (for example, commented on a blog post, emailed, etc.). However, there can be great value in identifying abstract groups. An abstract group, as used herein, can refer to a group in which the members need not interact explicitly, but must demonstrate cohesiveness in some way. In fact, the whole notion of compiling a focus group in marketing is based on the premise that one can make generalities about abstract groups: Marketers target demographic groups, for instance, females in the 18-25 age range. Abstract online groups go beyond demographics. For example, on LIVEJOURNAL, there are a number of categories (e.g., gaming) by which one can categorize himself and/or his blog. While a number of the entities that self select a particular category might interact, there is no explicit requirement that they do so. If one is interested in marketing to a gaming crowd, for instance, knowing all persons interested in gaming would be useful, even if they do not interact directly with one another.

Link type analyses are virtually ineffective at identifying abstract groups since the members are not necessarily connected. Accordingly, other methods are required to identify abstract groups, especially methods that do not rely solely on link analysis techniques.

SUMMARY

This document describes computer-implemented methods of automatically identifying online abstract groups that exhibit shared interests and/or characteristics. Traditional methods have defined online groups based almost solely on attributes such as links, page rank, and eigenvalues. The methods described herein automatically identify online abstract groups in which members' interests and online footprints are similar but they are not necessarily connected to one another explicitly. The methods utilize content-based features from social media to enhance knowledge regarding abstract group composition, members' likes and dislikes, relationships among members, etc. By including content-based features, embodiments described herein can utilize the actual text from social media in the analysis performed to identify abstract online groups.

The methods can comprise harvesting records from social media and extracting content-based and structure-based features from each record. Each record comprises a social-media posting and is associated with one or more entities. Each feature is stored on a data storage device and comprises a computer-readable representation of an attribute of one or more records. The methods further comprise grouping records into record groups according to the features of each record using clustering, classifying, and/or filtering algorithms executed by one or more processors. Further still the methods comprise calculating an n-dimensional surface representing each record group and defining an outlier as a record having feature-based distances measured from every n-dimensional surface that exceed a threshold value. Each of the n-dimensional surfaces is described by a footprint that characterizes the respective record group as an online abstract group. In one embodiment, the methods can further comprise presenting a visual representation that depicts the n-dimensional surface on a display device.

In some embodiments, at least a portion of the records in an online abstract group lacks explicit connections between records, between entities, and/or between records and entities. One example of an explicit connection includes, but is not limited to, a hyperlink. Since online abstract groups commonly lack links among members, one embodiment does not utilize link analysis techniques. In other embodiments, the records can comprise one or more foreign texts.

As used herein, a content-based feature can refer to features that require processing of the text content to identify salient linguistic features. One example includes, but is not limited to negative sentiment (i.e., a measure of how negative the content of the text is). A structure-based feature can refer to metadata that is extracted from the text without processing the context. Examples of metadata include, but are not limited to, the number of words in the text and when the text occurred. Various other examples of each are described elsewhere herein.

One example of a social media posting includes, but is not limited to, a tweet. Another example of a social media posting comprises a blog post, a comment to a post, or a blog post along with at least one comment. In such instances, a structure-based feature can comprise a duration of time from an initial tweet or blog post to a final tweet or comment regarding the initial tweet or blog post. Another structure-based feature can comprise a lag time between tweets, between blog posts, between comments, or between blog posts and comments. Yet another structure-based feature comprises a duration of time from initiation to conclusion of a record. Still another structure-based feature can include a lag time between entries within a record, a lag time between records, or both.

In one embodiment, the methods can further comprise extracting entity-based features from entities associated with records. As used herein, an entity-based feature can refer to persons, places, things or features related to persons, place, or things. One example of extracting entity-based features can include, but is not limited to, utilizing one or more link analysis techniques. Entity-based features can also be extracted from text using linguistic techniques.

The methods can further comprise calculating an affect score as a content-based feature of at least one record. Other examples of content-based features can include, but are not limited to, a classification of degree of agreement/disagreement, keywords of records, keywords within records, or both keywords of and within records.

In some embodiments, the features are derived from statistical analysis on the representation of one ore more attributes of one or more records (e.g., minimum, median, and maximum number of words in the comments to a specific blog post).

In other embodiments, at least one content-based or structure-based feature characterizes culturally defined behaviors within and/or between online abstract groups.

As used herein, an n-dimensional surface can refer to the range of values for each feature. A footprint can refer to an n-dimensional statistical representation of the n-dimensional surface. For instance the footprint could consist of the mean value of each feature. An example of a visualization of a footprint is a star plot. Other examples can include, but are not limited to, radar plots and histograms.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

Figure 1:
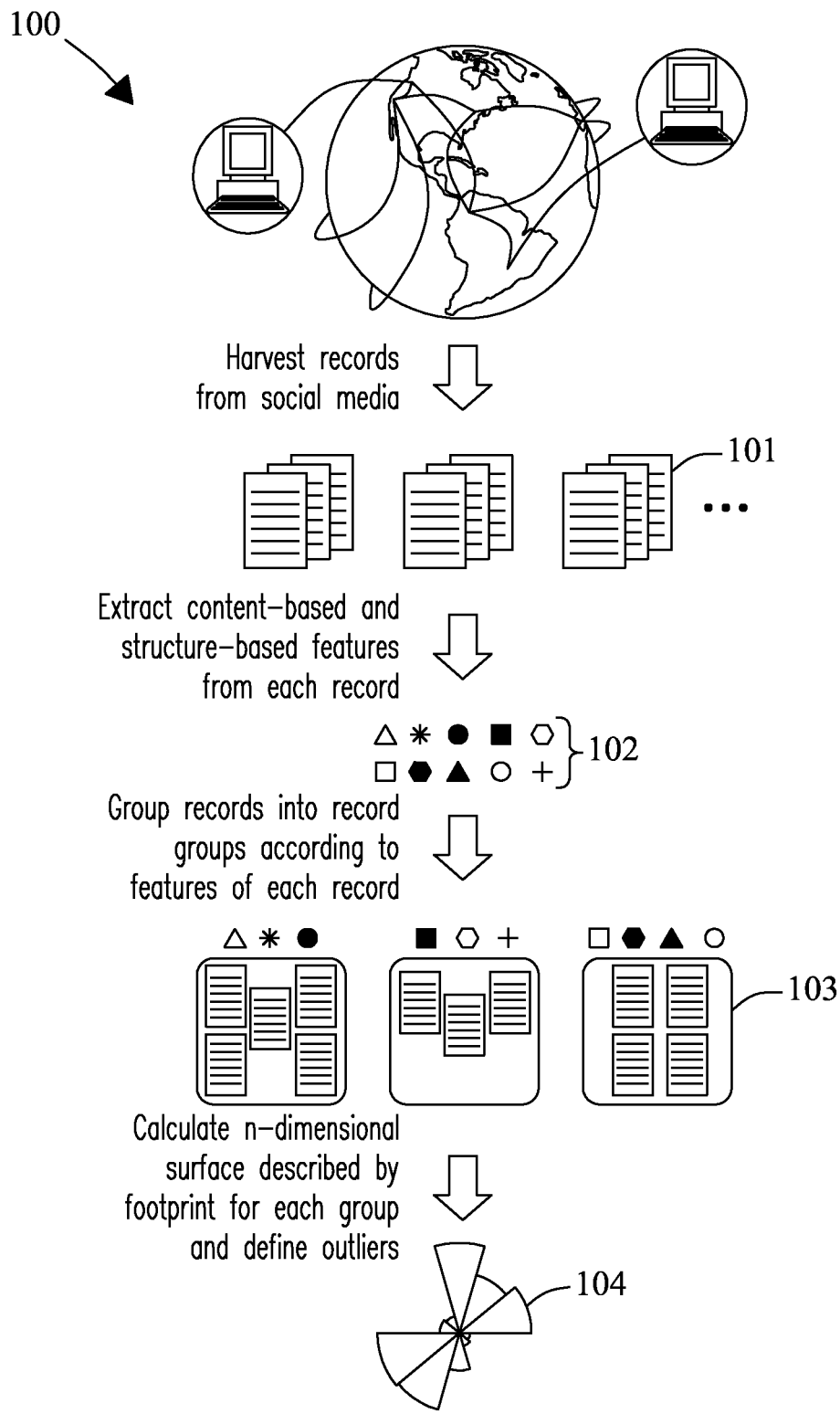
FIG. 1 is a schematic depicting one embodiment for automatically identifying online abstract groups.

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

FIGS. 1-5 show a variety of embodiments of the present invention. Referring first to in FIG. 1, an illustration depicts automatic identification of abstract online groups according to embodiments described herein. Records 101 can be harvested from social media 100. Examples of social media can include, but are not limited to, internet weblogs (i.e., blogs), blog comments, TWITTER® posts (i.e., tweets), and various other postings. From each record, content-based and structure-based features 102 are extracted. Record groups 103 are formed according to the features of each record. N-dimensional surfaces, described by footprints 104, are calculated and outliers are identified.

The methods described herein have been applied to automatically identify groups and group boundaries using a combination of content-based and structural features and to determine whether online groups that are explicitly connected (via having a corresponding physical group) behave differently than online groups in which the members do not interact at all.

A gold-standard dataset was created in which the groups to which entities belong are known. From this set, a number of features were extracted from the entities' posts and comments. The features include both structural-based and content-based information.

The data was harvested from LIVEJOURNAL® from online groups that were active during the 2010 calendar year. LIVEJOURNAL® allows blog authors to identify self-interests. The data sources were randomly selected and included 75 bloggers (individuals) who categorized themselves into a gaming group (2552 posts) and 75 bloggers who categorized themselves into a sewing group (2191 posts). In addition, to get an understanding of whether strictly online abstract groups behave different than online groups that correspond to physical groups, LIVEJOURNAL® posts from members of a church (6 authors; 713 posts) and posts from members of a university program (4 authors; 104 posts) were harvested. Finally, to see if any cultural differences within groups could be identified, gaming members from four different countries were extracted—371 from Spain, 742 from Russia, 1135 from France, and 1139 from the United States.

Typically, features for clustering social media tend to be based on structure alone, not content. Content-based features can require processing the text of all of the records to identify salient linguistic features. Because embodiments described herein do not require explicit interaction between the entities in groups, it is assumed that not such interaction exists. Accordingly, the content of the records are important in defining the nature of the groups. The features collected and used in present example are shown in Table 1.

TABLE 1

Features extracted (structure-based) and calculated (content-based) from the training dataset.

| Structure-Based | | Content-Based | |
|---|---|---|---|
| Post | Comment | Post | Comment |
| word count | number of Comments | positive (negative) sentiment | agree (disagree) with post |
| average word length | word count* | strong (weak) content | positive (negative) sentiment* |
| number of quoted words | time lag from post | theme | strong (weak) content* |
| author | total time duration | | |

*minimum, median, and maximum values

Some of the features are derived from statistical analysis on the representation of one ore more attributes of one or more records. For example, because there is generally more than one comment per post, the distribution (minimum, median, and maximum) for each content-based feature (parameter) for all comments on a single post was included in our parameter space.

In analyzing data from the United States, both structure-based and content-based data were used in the grouping analysis. For the data from different countries (e.g., languages), it can be difficult to calculate and verify the content-based variables. Therefore, in the instant example, the analysis focuses only on the following structure-based features (parameters) which were found to have significant impact on the grouping results:

1. Word count per post
2. Average word length per post
3. Number of quoted words per post
4. Number of links out per post
5. Number of Comments per post
6. Minimum number of words per comment
7. Median number of words per comment
8. Maximum number of words per comment
9. Comment lag from the post (first comment—post)
10. Comment duration (last comment—first comment)

Negative (or positive) sentiment was calculated as a feature for each document (post or comment) using a lexicon based approach described by Gregory et al. (see Gregory, M., Chinchor, N., Whitney, P., Carter, R., Hetzler, E., and Turner, A., 2006. User-Directed Sentiment Analysis: Visualizing the Affective Content of Documents. *ACL, Association for Computational Linguistics Workshop on Sentiment and Subjectivity in Text*, ACL, pp. 23-30). The lexicon is loosely based on the General Inquirer lexicon. For each document, Equation 1 is used to calculate the sentiment (affect).

$$affect_i = \frac{2 \cdot \sum (\text{affect terms})}{\sum (\text{all terms})} \quad (1)$$

Where affect, is the sentiment score for an individual document, Σ(affect terms) refers to the sum of all the negative (positive) terms within a document from the negative (positive) lexicon and Σ(all terms) refers to the total number of terms (words) within the document.

In the blog data, the following common indicators were observed of a comment agreeing or disagreeing with a post:

The comment states a stance on agreement, e.g. "I agree", "You're wrong"

The comment expresses an opinion about the post or the author, e.g. "I am distinctly unimpressed by your post"

The comment uses rhetoric associated with agreement or disagreement, e.g. "So, let me get this straight . . ."

The comment constructs a counter argument to the post, "It is a Statistical fact that . . . " For this analysis, the first three cases were targeted, which can potentially be identified with shallow processing approaches, compared to the fourth case, which will likely require deeper semantic interpretation in most cases. A heuristic approach was used based on a hand-built cue phrase lexicon and polarity of opinions in the comment. To identify an opinion about the post or author, a two-stage classification based approach was used. The approach is similar to that described by Pang et al. (B. Pang and L. Lee. *A Sentimental Education: Sentiment Analysis Using Subjectivity Summarization Based on Minimum Cuts*. Proceedings of ACL, pp. 271-278, 2004.), which first isolates subjective portions of the comments and then identifies polarity, using classifiers trained on movie reviews and plot summaries.

To identify themes/content within the posts, a method to identify major themes (see Rose, S., Butner, S., Cowley, W., Gregory, M., and Walker, J., 2009. Describing Story Evolution from Dynamic Information Streams. *IEEE Symposium on Visual Analytics Science and Technology (VAST* 2009), pp. 99-106) was incorporated. This method, Computation and Analysis of Significant Themes (CAST), clusters keywords extracted from the posts based on their post co-occurrences. These keyword clusters correspond to themes within the (blog) dataset. Each theme comprises the cluster of keywords and a set of posts strongly associated with those keywords. A label for each theme is selected as the keyword most highly associated with the posts assigned to the theme In the present example, groups were identified within the data using cluster analysis. The grouping process was broken into the following steps:

1. Scale data to consistent form (continuous or discrete)
2. Standardization
3. Dissimilarity matrix calculation
4. Cluster analysis The grouping is accomplished using partitioning around medoids (PAM). This method is similar to the K-means method, except the representative member of the cluster is a medoid, which is an actual data point (observation) within the cluster. A medoid (centotype) is defined as the object of a cluster with the minimal distance (d) to all other objects within the cluster. This method contains two main steps. First k medoids are selected (build-step). Then, objects (i) will be interchanged with the medoids ($mv_i$), based on minimizing the objective function. The objective function (O) is the sum of the distance (d) between all objects of the dataset to their nearest medoid, as shown in Equation 2. After finding the set of medoids, each object of the dataset is assigned to the nearest medoid ($mv_i$).

$$O = \Sigma d(i, mv_i). \quad (2)$$

Input into the clustering algorithm is a dissimilarity matrix that measures the distance between each observation. The selection of this (distance) algorithm is one of the choices of the process, since it directly affects the clustering results and is dependent on the type of data to be clustered. As shown elsewhere herein, the data is of mixed type (numerical and categorical). For this analysis the Gower's General Similarity Coefficient was used as it is useful for measuring proximity of mixed data types. The Gower's General Similarity Coefficient $S_{ij}$ compares two cases i and j, as shown in Equation 3.

$$S_{ij} = \frac{\sum_k W_{ijk} S_{ijk}}{\sum_k W_{ijk}}, \quad (3)$$

where $S_{ijk}$ denotes the contribution provided by the $k^{th}$ variable, $W_{ijk}$ is usually 1 or 0 depending upon whether or not the comparison is valid for the $k^{th}$ variable. It should be noted that the effect of the denominator $\Sigma W_{ijk}$ is to divide the sum of the similarity scores by the number of variables.

The clustering methods used herein have been shown to produce sufficient partitioning of many different types of data, but other methods can be applied and embodiments of the present invention are not limited to present clustering method.

From the grouping process, a characteristic footprint for each group is produced. This footprint is used to define the boundary of each group. The algorithm for calculating this footprint is dependent on the distribution of the numerical parameters (features) that were used to define (cluster) each group. In this instance, the arithmetic mean value of each parameter was used to define this characteristic footprint.

Identifying and characterizing groups enables one to test how accurately new observations (post and comments) can be placed within the appropriate group by placing each new observation into its "closest" group. The numerical parameters of the new observation and the numerical group footprint are used to calculate the distance between the observation and each group. A proportionality metric of themes that reside in each group are also calculated against each group. The closest group is defined by the minimum distance between the observation and each group. The themes proportionality metric is used to resolve which group to be placed when the numerical distance is very similar for two or more groups.

The final step in the example was to identify outliers. Outliers can be generally defined as those observations or group of observations that don't fit well into any of the defined groups. Statistical inference and order statistics can provide a model for describing outliers with statistical confidence.

Five experiments were conducted to identify and analyze groups. The goal of Experiment 1 was simply to see if the algorithms and methods cluster the gold standard datasets into appropriate groups. Data from all four groups were combined for this experiment. Clustering analysis was performed on a training set of 90% of the data, testing on 10%.

Experiment 2 was designed to see how well individual users can be grouped into their appropriate group. In other words, how do the footprints of individuals fall within the footprint of the entire group? Some embodiments of the methods described herein can be used to identify outliers to the groups.

One aspect of automatically identifying groups is to be able to define what appropriate group boundaries are. A group that is too large or diffuse is not much help. For Experiment 3 the methods and algorithms described herein are tested for their effectiveness at identifying subgroups within the most diffuse group, the gaming group. Although collected 75 members of each group were collected for the test data, the overall gaming community was actually much larger (thousands of members). The number of members coupled with the results from Experiment 1 suggests that this group should be further divided.

In Experiment 4 a synthesized Russian dataset was analyzed to identify known groups. This dataset consisted of blogs from LiveJournal from authors that belong to a known youth movement and other random authors. The goal of this analysis was to see if those authors that are associated with the youth movement could be identified based on non-content features using data from a foreign language (Russian).

Finally, for Experiment 5 the hypothesis that countries can be used as a surrogate for a culture is tested. Analysis was performed on the foreign gaming dataset utilizing embodiments described herein.

Table 2 provides the results of the clustering of blog posts to the correct group (Experiment 1) and individuals to a group (Experiment 2). The first portion of the table shows the results from the clustering analysis for the four groups. Two separate analyses were performed and are illustrated in the table. First, the gaming and sewing datasets were combined and clustered, as well as the church and school datasets (2 group comparison). An analysis of the clustering results showed that 67% of the true gaming observations were clustered together (shown in column two), while 78% of the true sewing observations, 83% of the true church and 62% of the true school observations were clustered correctly. The highlighted column in Table 2 (column three) shows the results of the analysis when all four datasets were combined and then analyzed (4 group comparison). The last column represents the baseline; the expected values for each group if the whole process was entirely random. These values are based on the distribution of observations within the combined datasets.

TABLE 2

Comparison of cluster results (% correct) to the self-rated grouping (gold-standard).

| Group | 2 group comparison | 4 group comparison | Baseline |
|---|---|---|---|
| Experiment 1 | | | |
| gaming | 67% | 52% | 40% |
| sewing | 78% | 76% | 43% |
| church | 83% | 38% | 14% |
| school | 62% | 10% | 2% |
| Experiment 2 | | | |
| gaming | 73% | 58% | 25% |
| sewing | 72% | 70% | 25% |
| church | 70% | 70% | 25% |
| school | 86% | 86% | 25% |
| Experiment 2 (themes and authors not used) | | | |
| gaming | 54% | 12% | 25% |
| sewing | 69% | 69% | 25% |
| church | 27% | 11% | 25% |
| school | 86% | 86% | 25% |

In Experiment 2, the posts from individual group members from the test dataset (10% of the total data) were placed into one of the defined groups. Each observation of the test dataset was placed into one of the groups based on the minimum distance to the different group footprints, with the theme being used to resolve minimum distances that were very similar. As in Experiment 1, the analysis was split into two parts; the two datasets analyzed separately (2 group comparison) and then all four datasets combined (4 group comparison).

The final analysis shown in Table 2 repeats the analysis for Experiment 2, except in this analysis the themes were not used in order to ensure the grouping effects were not solely due to this information. In other words, the placement of an observation was made entirely based on the group with the minimum distance using only the numerical parameters from the observation and the numerical footprint for each group.

Figure 2:
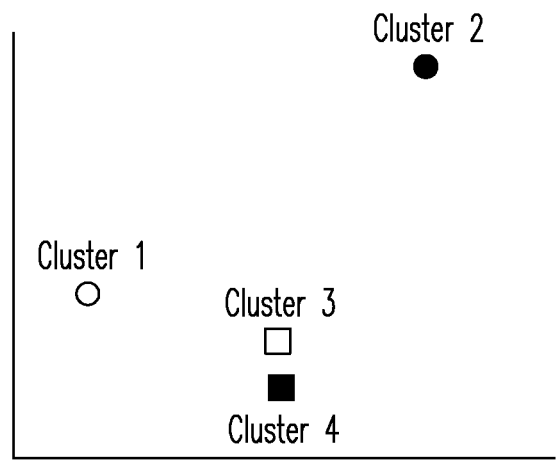
FIG. 2 is a chart depicting the spatial distribution among four clusters.

For Experiment 3 only the gaming dataset was clustered to identify any subgroups that might be present. The gaming posts fell into four main subgroups, each having a tighter distribution than the whole. The distance between groups was defined using only the numerical parameters and the Euclidean distance metric. The results of calculating the distance between each group is shown in FIG. 2.

Figure 3:
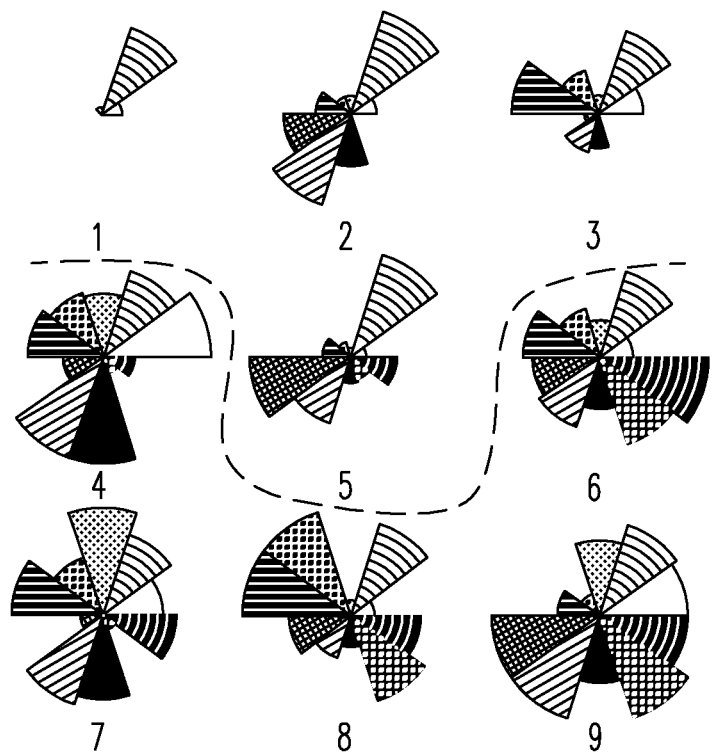
FIG. 3 contains star plots for nine authors and the groups into which they are assigned.

To test the grouping capability of these algorithms, a Russian dataset was analyzed. The dataset contained Russian blogs in which some blog authors belong to a single abstract group and some do not. The cluster analysis was performed on the structural data only, using the Gower dissimilarity calculation and the PAM clustering algorithm. The results are shown in Table 3. These results show that seven out of the nine authors were placed into the correct groups. Also, the star plots in FIG. 3 show a comparison of the numerical parameters used in the cluster analysis for each one of the nine authors. This comparison illustrates why authors were grouped together based on these parameters.

TABLE 3

Cluster results showing how well (probability) each author was placed into each group, using the Russian dataset.

| Author | P(Group 1) | P(Group 2) | Cluster Group | Actual Group |
|---|---|---|---|---|
| 1 | 0.00 | 1.000 | 2 | 2 |
| 2 | 0.014 | 0.986 | 2 | 2 |
| 3 | 0.037 | 0.963 | 2 | 2 |
| 4 | 0.854 | 0.146 | 1 | 1 |
| 5 | 0.219 | 0.781 | 2 | 1 |
| 6 | 0.699 | 0.301 | 1 | 1 |
| 7 | 0.845 | 0.155 | 1 | 1 |
| 8 | 0.750 | 0.250 | 1 | 1 |
| 9 | 0.812 | 0.188 | 1 | 2 |

The results of grouping gamers using the foreign dataset are shown in Tables 4 and 5. Table 4 shows the results from the clustering analysis when four groups were identified. The top half of the table shows the actual number of posts, by country, that were identified for each cluster (group). The bottom half of the table shows the relative distribution, by country, for each cluster. The relative values were calculated by taking the actual number of posts in each group and dividing them by the total number of members of each country. Table 5 shows the results from the cluster analysis when six groups were identified. The shaded cells represent those countries that dominate the membership of the identified group

TABLE 4

Country distribution of the foreign gaming dataset assuming 4 unique clusters.

| Cluster | USA | France | Russia | Spain | Total |
|---|---|---|---|---|---|
| 1 | 90 | 684 | 7 | 160 | 941 |
| 2 | 569 | 72 | 369 | 55 | 1065 |
| 3 | 53 | 101 | 332 | 36 | 522 |
| 4 | 427 | 278 | 34 | 120 | 859 |
| Total | 1139 | 1135 | 742 | 371 | 3387 |
| Cluster membership (%) | | | | | |
| 1 | 8 | 60 | 1 | 43 | |
| 2 | 50 | 6 | 50 | 15 | |
| 3 | 5 | 9 | 45 | 10 | |
| 4 | 37 | 24 | 5 | 32 | |

TABLE 5

Country distribution of the foreign gaming dataset assuming 6 unique clusters.

| Cluster | USA | France | Russia | Spain | Total |
|---|---|---|---|---|---|
| 1 | 83 | 449 | 6 | 102 | 640 |
| 2 | 477 | 65 | 119 | 37 | 698 |
| 3 | 412 | 90 | 91 | 64 | 657 |
| 4 | 116 | 270 | 11 | 80 | 477 |
| 5 | 7 | 12 | 487 | 11 | 517 |
| 6 | 44 | 249 | 28 | 77 | 398 |
| Total | 1139 | 1135 | 742 | 371 | 3387 |
| Cluster membership (%) | | | | | |
| 1 | 7 | 40 | 1 | 27 | |
| 2 | 42 | 6 | 16 | 10 | |
| 3 | 36 | 8 | 12 | 17 | |
| 4 | 10 | 24 | 1 | 22 | |
| 5 | 1 | 1 | 66 | 3 | |
| 6 | 4 | 22 | 4 | 21 | |

Figure 4:
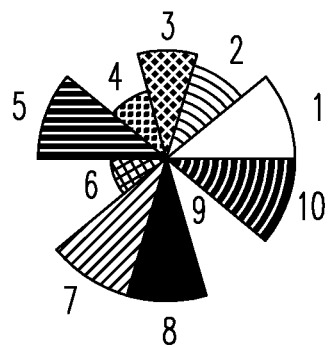
FIG. 4 includes depictions for six footprints of groups.
Figure 4:
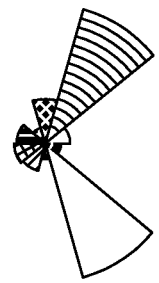
Figure 4:
Figure 4:
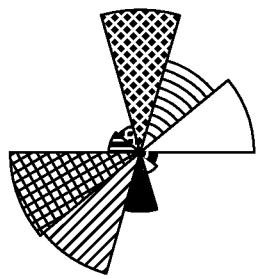
Figure 4:
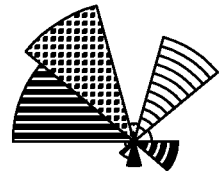
Figure 4:
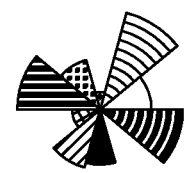
Figure 5:
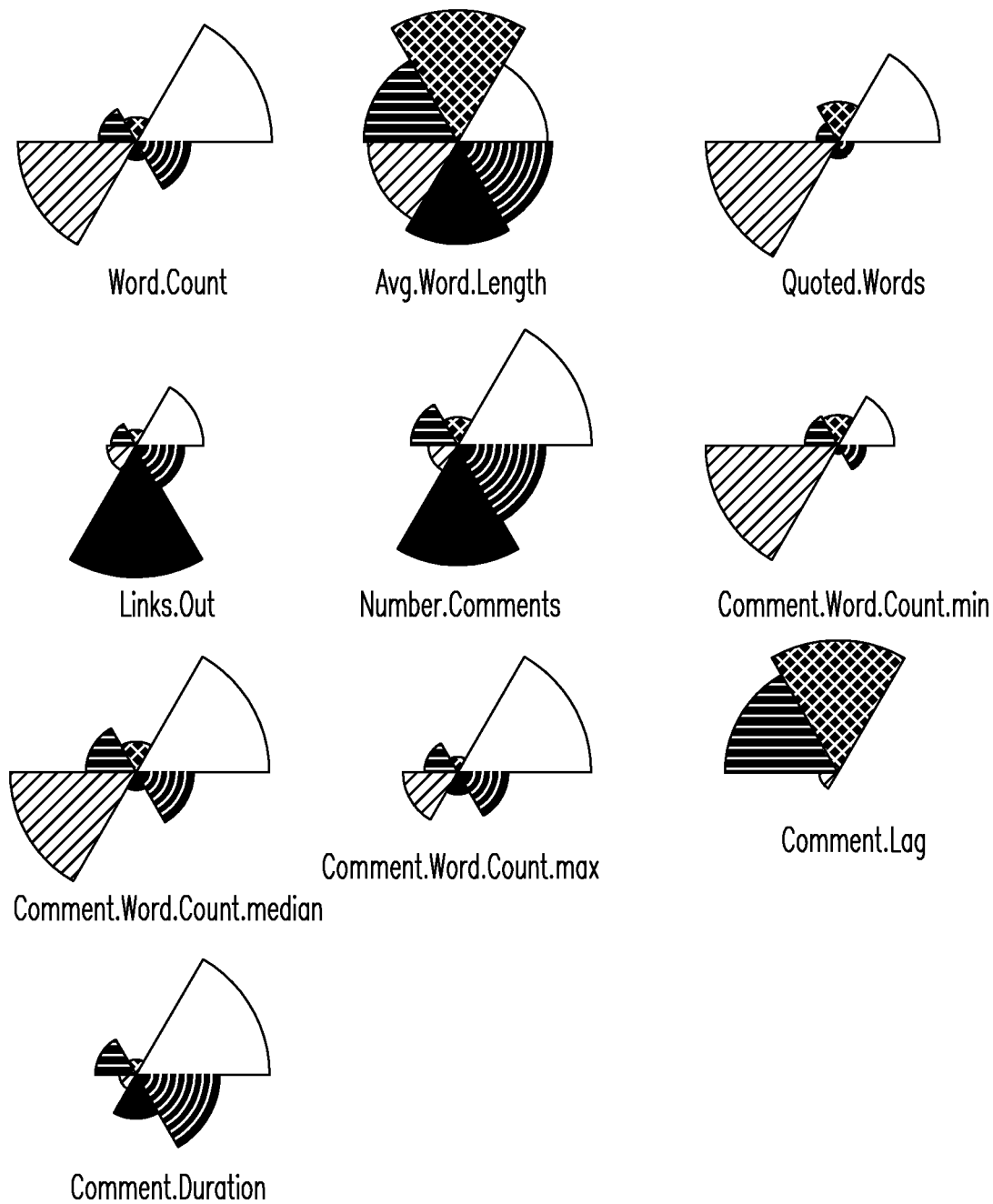
FIG. 5 includes characteristic footprints for six cluster results, comparing clusters for each parameter.

To better describe the clustering results and the individual groups, a characteristic footprint for each group (cluster) is calculated. The footprint for each cluster corresponding to the foreign gaming analysis using six clusters is shown in FIGS. 4 and 5. In these figures, a star plot is shown for each cluster. The area of each piece corresponds to the mean value for each parameter. These plots show the difference in each parameter between the different clusters, which can be used (visually) to identify the key distinguishing parameters. The numbers in the top left plot of FIG. 4 represents the parameter number as presented in an earlier section.

In one instance, a single footprint was created for each group based on the features used in the clustering method and applied to the training set. Each observation from the test set was compared to each group footprint to find the "closest" group to each observation. These results were significantly better than Experiment 1. When all four datasets were combined, only one group did not perform similar to the separate dataset experiment (gaming accuracy decreased from 73% to 58%). This is attributed to the broad nature of the group. Once a footprint of a group is defined, the methods described herein can accurately identify whether an entity belongs in a particular group, or whether an individual is an outlier to that group.

Since four distinct gaming groups were identified, similarities among the groups were able to be determined. An analysis of the features of these groups showed that two of the groups were very similar and two of the groups tended to be different. A distance was calculated between each group and the distances were spatially plotted. From this plot, it was clear that one group could be identified as an outlier (cluster 2). An investigation of the themes confirmed that this sub-group was in fact different from the others.

A separate Russian dataset which contained posts and comments from a known group was also analyzed. This dataset was augmented with posts and comments from authors that were not identified with the known group. The data was not translated into English before the analysis. The results of this analysis showed that the authors were successfully grouped seven out of nine times (77.8%). A further analysis of the characteristic footprint for each author showed why the cluster analysis grouped the authors the way that it did.

Further still, a foreign dataset containing self-identified gamers from four countries was analyzed. From the cluster analysis results shown in Tables 4 and 5 (gaming dataset), distinct groups can be identified which isolate posts from individual countries. For example, the majority of the members in Cluster-3, in Table 3, are from Russia (64% of all Cluster-3 members and 45% of all of the Russian blogs were grouped into Cluster-3).

The footprints shown in FIGS. 3 and 4, which represent the characteristics (parameters) of each cluster, identify those parameters which tend to isolate the groups. For instance the majority of members in cluster 2 and 3 are from the United States (Table 5). The characteristic footprints of these two groups (FIG. 3) tend to look similar (high values for the Average Word Length and Comment Lag variables and low values for the other variables). However, a further investigation shows that the two variables with the high values (Average Word Length and Comment Lag) are larger for Cluster-2, while the remaining variables are larger for Cluster-3.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A computer-implemented method of automatically identifying online abstract groups comprising entities that exhibit shared interests and/or characteristics, the method comprising:

Harvesting records from social media, each record comprising a social-media posting and being associated with one or more entities;

Extracting content-based and structure-based features from each record, each feature stored on a data storage device and comprising a computer-readable representation of an attribute of one or more records;

Grouping records into record groups according to the features of each record using clustering, classifying, and/or filtering algorithms executed by one or more processors;

Calculating an n-dimensional surface representing each record group, each n-dimensional surface described by a footprint that characterizes the respective record group as an online abstract group;

Defining an outlier as a record having feature-based distances measured from every n-dimensional surface that exceed a threshold value.

2. The computer-implemented method of claim 1, wherein at least a portion of the records in an online abstract group lacks explicit connections between records, between entities, and/or between records and entities.

3. The computer-implemented method of claim 1, wherein the social media posting comprises a blog post, at least one comment, or both.

4. The computer-implemented method of claim 3, wherein a structure-based feature comprises a duration of time from an initial blog post to a final comment regarding the initial blog post.

5. The computer-implemented method of claim 3, wherein a structure-based feature comprises lag time between blog posts, between comments, or between blog posts and comments.

6. The computer-implemented method of claim 1, wherein the social media posting comprises a tweet.

7. The computer-implemented method of claim 1, wherein the records comprise one or more foreign texts.

8. The computer-implemented method of claim 1, further comprising extracting entity-based features from entities associated with records.

9. The computer-implemented method of claim 8, wherein said extracting entity-based features comprises utilizing one or more link analysis techniques.

10. The computer-implemented method of claim 1, wherein the automatically identifying abstract online groups does not utilize link analysis techniques.

11. The computer-implemented method of claim 1, further comprising calculating an affect score as a content-based feature of at least one record.

12. The computer-implemented method of claim 1, wherein a content-based feature comprises a classification of degree of agreement/disagreement.

13. The computer-implemented method of claim 1, wherein a content-based feature comprises keywords of records, keywords within records, or both.

14. The computer-implemented method of claim 1, wherein a structure-based feature comprises a duration of time from initiation to conclusion of a record.

15. The computer-implemented method of claim 1, wherein a structure-based feature comprises a lag time between entries within in a record, a lag time between records, or both.

16. The computer-implemented method of claim 1, wherein the features are derived from statistical analysis on the representation of one or more attributes of one or more records.

17. The computer-implemented method of claim 1, further comprising presenting a visual representation that depicts the n-dimensional surface on a display device.

18. The computer-implemented method of claim 1, wherein at least one content-based or structure-based feature characterizes culturally defined behaviors within and/or between online abstract groups.

* * * * *